US012755871B2

(12) United States Patent
Zhang et al.

(10) Patent No.: US 12,755,871 B2
(45) Date of Patent: Oct. 6, 2026

(54) METHOD FOR MANUFACTURING A PEEK INSULATED WIRE

(71) Applicant: TONGLING JINGDA SPECIAL MAGNET WIRE CO., LTD., Tongling (CN)

(72) Inventors: Peisheng Zhang, Tongling (CN); Yaya Yuan, Tongling (CN); Baoxin Su, Tongling (CN); Wei Zhang, Tongling (CN)

(73) Assignee: TONGLING JINGDA SPECIAL MAGNET WIRECO., LTD., Tongling (CN)

( * ) Notice: Subject to any disclaimer, the term of this patent is extended or adjusted under 35 U.S.C. 154(b) by 0 days.

(21) Appl. No.: 19/286,325

(22) Filed: Jul. 31, 2025

(65) Prior Publication Data

US 2026/0106057 A1 Apr. 16, 2026

(30) Foreign Application Priority Data

Oct. 10, 2024 (CN) ........................ 202411405096.X

(51) Int. Cl.
*H01B 13/14* (2006.01)

(52) U.S. Cl.
CPC .................................. *H01B 13/145* (2013.01)

(58) Field of Classification Search
CPC ...... H01B 13/145; H01B 13/14; H01B 13/16; B29C 48/06; B29C 48/287; B29C 48/022; B29C 48/2883; B29C 48/92; B29C 48/154
See application file for complete search history.

(56) References Cited

U.S. PATENT DOCUMENTS

| | | | | | |
|---|---|---|---|---|---|
| 3,929,006 | A | * | 12/1975 | Boggs | H01B 13/00 73/609 |
| 9,146,092 | B2 | | 9/2015 | Kyriakis | |
| 2009/0043532 | A1 | | 2/2009 | Sikora | |

FOREIGN PATENT DOCUMENTS

| | | | | | |
|---|---|---|---|---|---|
| CN | 109159395 | A | | 1/2019 | |
| CN | 110355973 | A | | 10/2019 | |
| CN | 111554443 | A | * | 8/2020 | H01B 13/00 |
| CN | 115722609 | A | * | 3/2023 | |
| CN | 117690656 | A | | 3/2024 | |
| DE | 101713634 | A1 | | 5/2010 | |
| JP | 10154426 | A | | 6/1998 | |

* cited by examiner

*Primary Examiner* — Daniel McNally
(74) *Attorney, Agent, or Firm* — Ming Jiang; OPENPTO US LLC

(57) ABSTRACT

A method for manufacturing a PEEK insulated wire is provided in the technical field of insulated wire manufacturing. The method comprises the steps of: preparing a PEEK material by drying it to completely remove moisture; paying off a core wire under suitable tension; pre-heating the core wire before contact with the PEEK material; performing plasma cleaning on the core wire; and extrusion coating the core wire by installing a matching pressure extrusion die on an extruder and using vacuum extrusion. The process further includes cooling the wire, performing online inspection of the coating film's eccentricity using an eccentricity detection device, and taking up the finished wire. This method improves the adhesion of the PEEK material to the core wire, reduces the possibility of localized surface pulverization and embrittlement, and thereby increases the service life of the PEEK insulated wire.

7 Claims, 6 Drawing Sheets

METHOD FOR MANUFACTURING A PEEK INSULATED WIRE

TECHNICAL FIELD

The present application relates to the field of insulated wire manufacturing, and more particularly, to a method for manufacturing a PEEK insulated wire.

BACKGROUND

PEEK (Polyetheretherketone) wires, which are wires coated with a PEEK insulating material layer, exhibit excellent chemical resistance, thermal stability, and oxidation resistance, along with good mechanical strength, creep resistance, and electrical properties. They can withstand high-energy radiation and have good flame retardancy. The long-term operating temperature range for PEEK can be from −100° C. to +250° C.

In the prior art, PEEK insulated wires are manufactured using a direct coating method, wherein a PEEK varnish is directly applied to a core wire and then cured into a film by high-temperature baking. However, with this method, the adhesion of the PEEK layer to the conductor is poor. After a period of use, the surface of the PEEK insulated wire may experience localized pulverization and embrittlement, which adversely affects the service life of the PEEK insulated wire.

SUMMARY

To improve the adhesion of the PEEK insulating layer to the conductor and extend the service life of PEEK insulated wires, the present application provides a method for manufacturing a PEEK insulated wire.

The method for manufacturing a PEEK insulated wire provided by the present application adopts the following technical solution:

A method for manufacturing a PEEK insulated wire, comprising the following steps:

- PEEK material preparation: Drying a PEEK material for a certain period to completely remove moisture;
- Wire pay-off: Unwinding a core wire under a predetermined tension value;
- Pre-heating: Pre-heating the core wire before it comes into contact with the PEEK material;
- Plasma cleaning: Performing plasma cleaning on the core wire;
- Extrusion coating: Installing a matching pressure extrusion die on the head of an extruder according to the specifications of the PEEK insulated wire to be produced, and extruding the PEEK material using vacuum extrusion;
- Cooling;
- Online inspection: Utilizing an eccentricity detection device (2) to perform online inspection of the eccentricity of the coating film on the PEEK insulated wire;
- Wire take-up.

Optionally, in the pre-heating step, the core wire is pre-heated by means of vacuum induction heating.

Optionally, if the raw material for the core wire is a formed soft flat conductor, the core wire is directly pre-heated after the pay-off step. If the raw material for the core wire is a round conductor, it must sequentially undergo round drawing, rolling, and flat drawing steps before pre-heating. If the raw material for the core wire is an extruded flat conductor, it must undergo a flat drawing step before pre-heating.

Optionally, if the raw material for the core wire is a round conductor or an extruded flat conductor, after completing the flat drawing, it is cleaned, followed by a blow-drying and/or oven-drying treatment. After the surface is dry, an annealing treatment is performed.

Optionally, the eccentricity detection device comprises a fixed frame through which the PEEK insulated wire can pass. The inner circumferential surface of the fixed frame is provided with an upper coating thickness gauge, a lower coating thickness gauge, a left coating thickness gauge, and a right coating thickness gauge on its top, bottom, left, and right sides, respectively. The upper, lower, left, and right coating thickness gauges are located on the same vertical plane and are used to measure the coating thickness on the top, bottom, left, and right sides of the same cross-section of the PEEK insulated wire.

Optionally, the upper, lower, left, and right coating thickness gauges are each fixedly connected to a sliding rod. Each said sliding rod is centripetally and slidably arranged on the fixed frame. The front and rear sides of the upper, lower, left, and right coating thickness gauges are each provided with abutment wheels for contacting the PEEK insulated wire. Each said abutment wheel is connected to the sliding rod on the corresponding side via a connecting bracket. Each said sliding rod is secured to the fixed frame by a locking member.

Optionally, in the extrusion coating step, before the core wire enters the extruder, the running position of the core wire is adjusted by an eccentricity adjustment device to ensure that the core wire always remains at the extrusion center of the said pressure extrusion die.

Optionally, the eccentricity adjustment device comprises a base frame, a left limit roller and a right limit roller for laterally limiting the core wire, and an upper limit roller and a lower limit roller for vertically limiting the core wire. The distance between the left and right limit rollers is adjustably configured, and the distance between the upper and lower limit rollers is adjustably configured.

The base frame is provided with a horizontal movement unit and a first driving member for driving the horizontal movement unit to move in the width direction of the base frame. The left limit roller and the right limit roller are arranged on the horizontal movement unit.

The base frame is provided with a vertical movement unit and a second driving member for driving the vertical movement unit to move up and down. The upper limit roller and the lower limit roller are arranged on the vertical movement unit.

Optionally, the eccentricity adjustment device further comprises a processor. The upper, lower, left, and right coating thickness gauges, the first driving member, and the second driving member are each in signal communication with the processor.

Optionally, the eccentricity adjustment device adjusts the coating film eccentricity of the PEEK insulated wire using the following steps:

- S1: According to the cross-sectional dimensions of the PEEK insulated wire, adjust each sliding rod so that the four sides of the PEEK insulated wire abut against the corresponding abutment wheels, and after ensuring the PEEK insulated wire is centered within the fixed frame, lock each sliding rod;
- S2: The upper, lower, left, and right coating thickness gauges simultaneously measure the thickness of the four corresponding sides of the coating film on the PEEK insulated wire. The thickness value measured by the upper coating thickness gauge is ‘a’, the value by the lower gauge is 'b', the value by the left gauge is 'c', and the value by the right gauge is 'd';

S3: The upper, lower, left, and right coating thickness gauges transmit the measured thickness values a, b, c, and d as signals to the processor;

S4: The processor calculates the required displacement H for the vertical movement unit according to the formula $H=p\cdot(a-b)/2$ and the required displacement X for the horizontal movement unit according to the formula $X=p\cdot(c-d)/2$, and transmits the numerical values X and H as signals to the first and second driving members, respectively;

S5: When $H<0$, the second driving member drives the vertical movement unit to move down; when $H=0$, the vertical movement unit remains in its original position; when $H>0$, the second driving member drives the vertical movement unit to move up. The movement distance is always $p\cdot|(a-b)/2|$.

When $X<0$, the first driving member drives the horizontal movement unit to move right; when $X=0$, the horizontal movement unit remains in its original position; when $X>0$, the first driving member drives the horizontal movement unit to move left. The movement distance is always $p\cdot|(c-d)/2|$.

Wherein, p is an adjustment coefficient greater than 1.

In summary, the present application includes at least one of the following advantageous effects:

1. In the present application, after the core wire undergoes plasma cleaning before extrusion coating, its surface is slightly etched, the contact angle is significantly reduced, and the surface roughness is significantly increased. This is beneficial for improving the bonding force with the PEEK material, thereby enhancing the adhesion of the PEEK material to the core wire, reducing the possibility of localized pulverization and embrittlement on the surface of the PEEK insulated wire, and extending its service life.
2. Pre-heating the core wire by means of vacuum induction heating is more efficient and provides more uniform heating compared to traditional open-air resistance heating. Furthermore, this heat treatment can also improve the bonding performance of the core wire through the orientation symmetry between crystal grains.
3. The present application measures the coating thickness on the top, bottom, left, and right sides of the PEEK insulated wire and transmits the measurement data to a processor. The processor calculates the required displacement for core wire correction and transmits the displacement data to the first and second driving members, thereby adjusting the running position of the core wire in real-time to ensure it always remains at the extrusion center of the die, thus reducing the eccentricity of the coating film.

Figure 1:
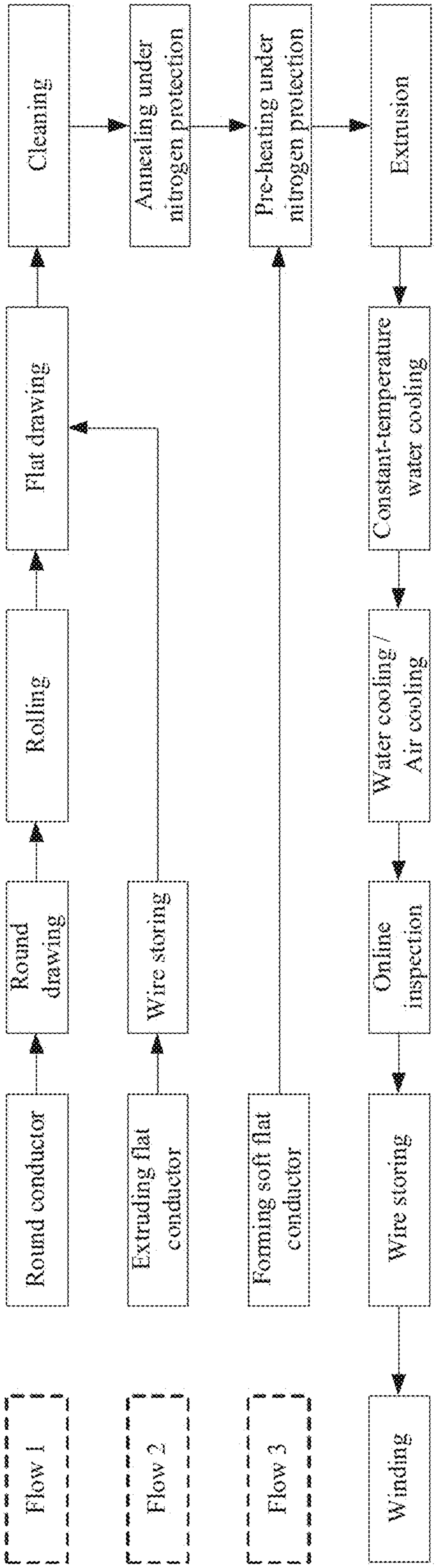
FIG. 1 is a process flow chart of a method for manufacturing a PEEK insulated wire according to an embodiment of the present application.

Reference Numerals: 1. Eccentricity adjustment device 11. Base frame 111. Left limit roller 112. Right limit roller 113. Upper limit roller 114. Lower limit roller 12. Horizontal movement unit 121. First driving member 13. Vertical movement unit 131. Second driving member 14. Processor. 2. Eccentricity detection device 21. Fixed frame 22. Upper coating thickness gauge 23. Lower coating thickness gauge 24. Left coating thickness gauge 25. Right coating thickness gauge 26. Sliding rod 27. Abutment wheel 28. Connecting bracket 29. Locking member.

DETAILED DESCRIPTION

The present application will be further described in detail below with reference to FIG. 1-7.

Embodiment

An embodiment of the present application discloses a method for manufacturing a PEEK insulated wire.

Figure 2:
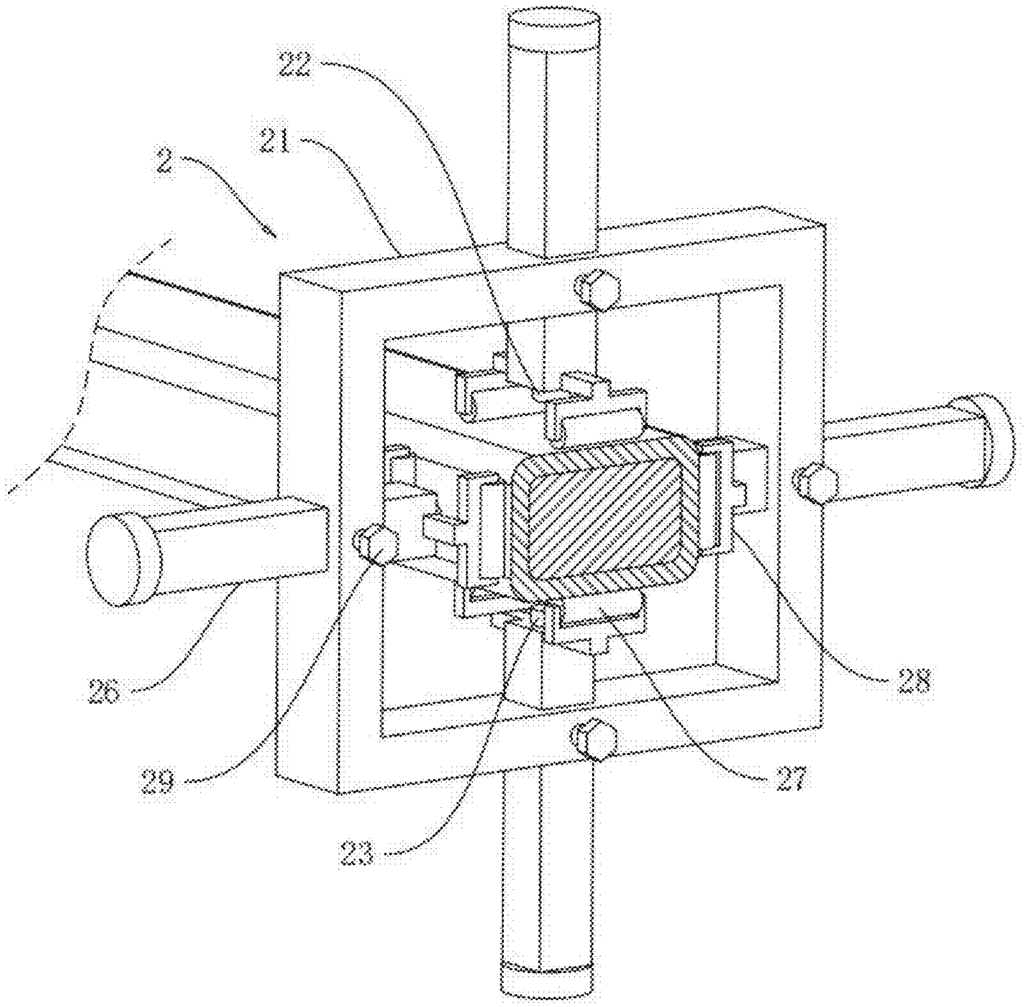
FIG. 2 is a schematic structural diagram of an eccentricity detection device in an embodiment of the present application.

Referring to FIG. 1-2, a method for manufacturing a PEEK insulated wire comprises the following steps:

PEEK material preparation: Because the processing of PEEK requires the material to be pure, clean, and not damp—otherwise, the process, coating structure, and product performance will be affected—the PEEK material must be baked at a temperature of 100-150° C. for over 8 hours before processing to ensure complete moisture removal. In this embodiment, the PEEK material can be any one of polyaryletherketone (PAEK), polyetherketone (PEK), polyetheretherketone (PEEK), polyetherketoneketone (PEKK), polyetheretherketoneketone (PEEKK), polyetherketoneetherketoneketone (PEKEKK), and fluorinated polyetheretherketone (FPEEK).

Wire pay-off: The core wire is unwound under a predetermined tension value. In this embodiment, the core wire material can be a high-conductivity metal such as pure copper, pure aluminum, or a copper-silver alloy.

Pre-heating: Before the core wire comes into contact with the PEEK material, it is pre-heated by means of vacuum induction heating. Compared to traditional open-air resistance heating, this method is more efficient and provides more uniform heating. Furthermore, this heat treatment can also improve the bonding performance of the core wire through the orientation symmetry between crystal grains.

Plasma cleaning: An atmospheric direct-injection plasma cleaner is used to perform plasma cleaning on the core wire. After plasma cleaning, the surface of the core wire is slightly etched, the contact angle is significantly reduced, and the surface roughness is significantly increased. This is beneficial for improving the bonding force with the PEEK material, thereby enhancing the adhesion of the PEEK material to the core wire, reducing the possibility of localized pulverization and embrittlement on the surface of the PEEK insulated wire, and extending its service life.

Extrusion coating: According to the specifications of the PEEK insulated wire to be produced, a matching die is installed on the head of the extruder, and the PEEK material is extruded using vacuum extrusion. To further enhance the tightness of the bond between the PEEK material and the core wire and to improve the surface flatness of the PEEK insulated wire, a pressure extrusion die is used.

Cooling: When the ambient temperature is below a specified temperature, the PEEK insulated wire is directly air-cooled after exiting the die. When the ambient temperature is above the specified temperature, forced-air cooling and/or water cooling methods are used for cooling treatment.

Online inspection: An eccentricity detection device 2 is used to perform online inspection of the eccentricity of the coating film on the PEEK insulated wire, facilitating timely adjustment of the coating eccentricity and improving the quality of the finished PEEK insulated wire.

Wire take-up: A take-up device is used for storing and winding the PEEK insulated wire.

In the aforementioned pay-off step, the raw material for the core wire can be one of a round conductor, an extruded flat conductor, or a formed soft flat conductor. If the raw material is a formed soft flat conductor, it is directly pre-heated after the pay-off step. If the raw material is a round conductor, it must sequentially undergo round drawing, rolling, and flat drawing steps before pre-heating. If the raw material is an extruded flat conductor, it must undergo a flat drawing step before pre-heating. Furthermore, if the raw material is a round conductor or an extruded flat conductor, after completing the flat drawing, it is cleaned with an ultrasonic cleaning machine to remove surface stains, followed by a blow-drying and/or oven-drying treatment. After the surface is dry, an annealing treatment is performed. In this embodiment, induction heating is used for the annealing treatment, and nitrogen gas is used in the heating furnace to protect the metal conductor, achieving the goal of softening the metal conductor, thereby reducing its hardness and increasing its plasticity to facilitate processing and ensure processing quality.

Figure 3:
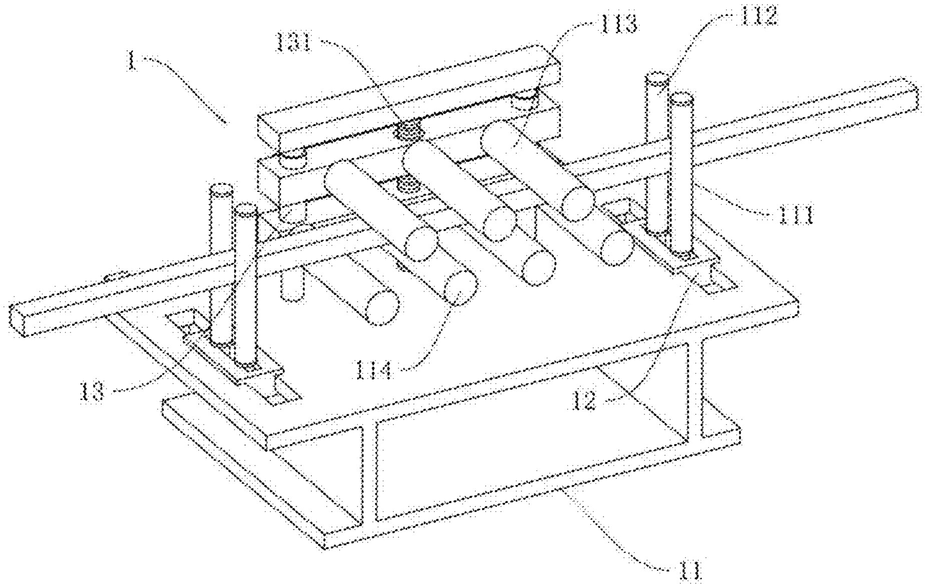
FIG. 3 is a schematic structural diagram of an eccentricity adjustment device in an embodiment of the present application.

Referring to FIG. 1 and FIG. 3, in the aforementioned extrusion coating step, before the core wire enters the extruder, its running position is adjusted by an eccentricity adjustment device 1 to ensure that the core wire always remains at the extrusion center of the die, thereby reducing the eccentricity of the coating film.

Figure 4:
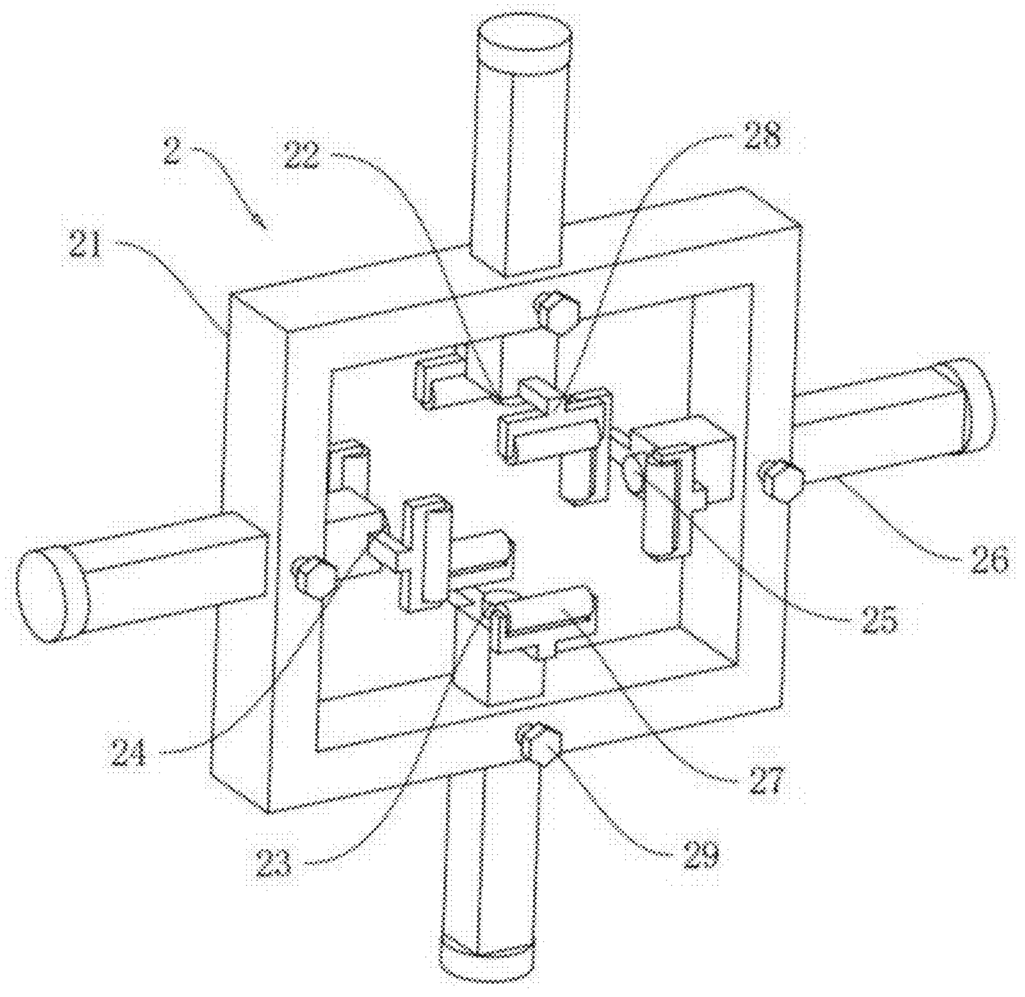
FIG. 4 is a schematic structural diagram of the upper, lower, left, and right coating thickness gauges in an embodiment of the present application.

Referring to FIG. 2 and FIG. 4, the eccentricity detection device 2 comprises a fixed frame 21 through which the PEEK insulated wire can pass. The inner circumferential surface of the fixed frame 21 is provided with an upper coating thickness gauge 22, a lower coating thickness gauge 23, a left coating thickness gauge 24, and a right coating thickness gauge 25 on its top, bottom, left, and right sides, respectively. The upper, lower, left, and right coating thickness gauges are located on the same vertical plane and are used to measure the coating thickness on the top, bottom, left, and right sides of the same cross-section of the PEEK insulated wire. This facilitates the online measurement of the eccentricity of the PEEK insulated wire, allowing the operator to adjust the eccentricity in a timely manner to ensure the production quality of the PEEK insulated wire.

Referring to FIG. 4, the upper coating thickness gauge 22, lower coating thickness gauge 23, left coating thickness gauge 24, and right coating thickness gauge 25 are each fixedly connected to a sliding rod 26. Each sliding rod 26 is centripetally and slidably arranged on the fixed frame 21. The front and rear sides of the upper, lower, left, and right coating thickness gauges are each provided with abutment wheels 27 for contacting the PEEK insulated wire. Each abutment wheel 27 is connected to the sliding rod 26 on the corresponding side via a connecting bracket 28. Each sliding rod 26 is secured to the fixed frame 21 by a locking member 29. In this manner, on one hand, the abutment wheels 27 on the four sides confine the PEEK insulated wire within the fixed frame 21, facilitating wire guidance. On the other hand, with this structure, regardless of any changes in the specifications of the PEEK insulated wire, the distance between the upper, lower, left, and right coating thickness gauges (22, 23, 24, 25) and the surface of the corresponding coating film can always be kept constant, thereby ensuring the consistency of the measurement distance for the gauges and thus ensuring the accuracy of the measurement results.

Figure 5:
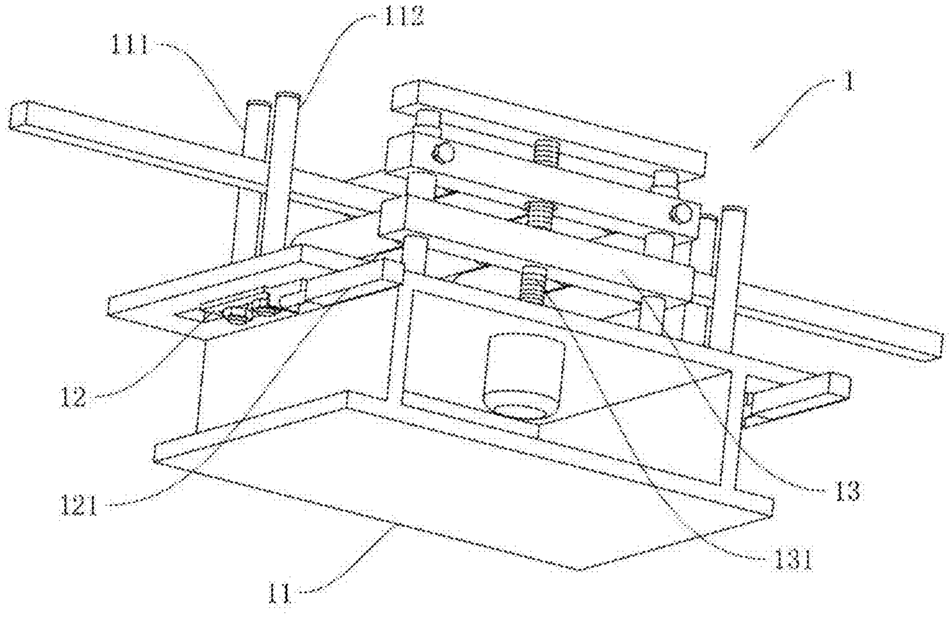
FIG. 5 is a schematic structural diagram of the first and second driving members in an embodiment of the present application.

Referring to FIG. 3 and FIG. 5, the eccentricity adjustment device 1 comprises a base frame 11, a left limit roller 111 and a right limit roller 112 for laterally limiting the core wire, and an upper limit roller 113 and a lower limit roller 114 for vertically limiting the core wire. The distance between the left and right limit rollers is adjustably configured, and the distance between the upper and lower limit rollers is adjustably configured.

The base frame 11 is provided with a horizontal movement unit 12 and a first driving member 121 for driving the horizontal movement unit 12 to move in the width direction of the base frame 11. The left limit roller 111 and the right limit roller 112 are arranged on the horizontal movement unit 12. The base frame 11 is provided with a vertical movement unit 13 and a second driving member 131 for driving the vertical movement unit 13 to move up and down. The upper limit roller 113 and the lower limit roller 114 are arranged on the vertical movement unit 13.

Figure 6:
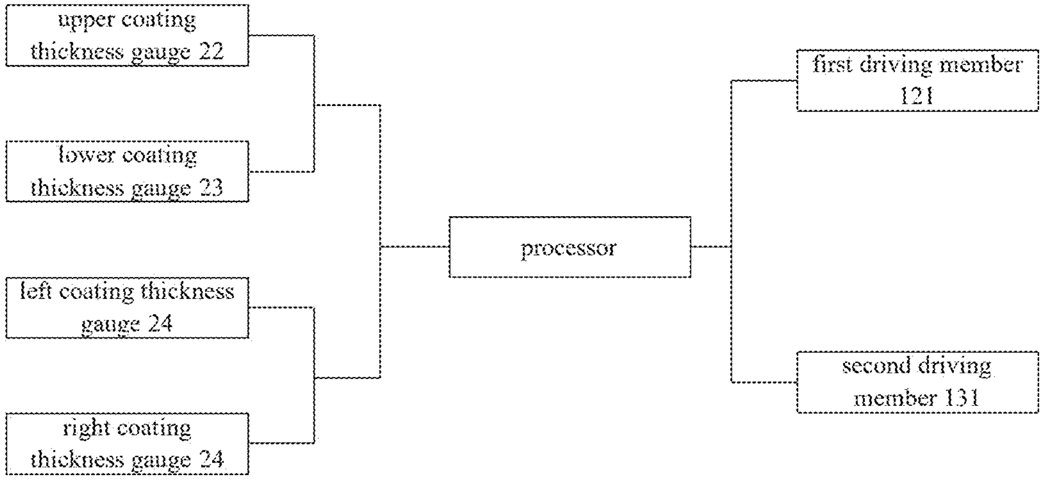
FIG. 6 is a schematic diagram of the processor in an embodiment of the present application.

Referring to FIG. 4-6, the eccentricity adjustment device 1 further comprises a processor 14. The upper coating thickness gauge 22, lower coating thickness gauge 23, left coating thickness gauge 24, right coating thickness gauge 25, first driving member 121, and second driving member 131 are each in signal communication with the processor 14. In this embodiment, the first driving member 121 is an electric push rod, and the second driving member 131 is a ball screw module.

The operating steps of the eccentricity adjustment device 1 are as follows:

S1: According to the cross-sectional dimensions of the PEEK insulated wire, adjust each sliding rod 26 so that the four sides of the PEEK insulated wire abut against the corresponding abutment wheels 27, and after ensuring the PEEK insulated wire is centered within the fixed frame 21, lock each sliding rod 26.

S2: The upper coating thickness gauge 22, lower coating thickness gauge 23, left coating thickness gauge 24, and right coating thickness gauge 25 simultaneously measure the thickness of the four corresponding sides of the coating film on the PEEK insulated wire. The thickness value measured by the upper gauge 22 is 'a', the value by the lower gauge 23 is 'b', the value by the left gauge 24 is 'c', and the value by the right gauge 25 is 'd'.

S3: The upper, lower, left, and right coating thickness gauges (22, 23, 24, 25) respectively transmit the measured thickness values a, b, c, and d as signals to the processor 14.

S4: The processor 14 calculates the required displacement H for the vertical movement unit 13 according to the formula $H=p\cdot(a-b)/2$ and the required displacement X for the horizontal movement unit 12 according to the formula $X=p\cdot(c-d)/2$. It then transmits the numerical values X and H as signals to the first driving member 121 and the second driving member 131, respectively.

S5: When H<0, the second driving member 131 drives the vertical movement unit 13 to move down; when H=0, the vertical movement unit 13 remains in its original position; when H>0, the second driving member 131 drives the vertical movement unit 13 to move up. The movement distance is always $p\cdot|(a-b)/2|$. When X<0, the first driving member 121 drives the horizontal movement unit 12 to move right; when X=0, the horizontal movement unit 12 remains in its original position; when X>0, the first driving member 121 drives the horizontal movement unit 12 to move left. The movement distance is always $p\cdot|(c-d)/2|$.

Let the position of the die orifice of the pressure extrusion die be point A, the position of the eccentricity detection device be point B, and the position of the eccentricity adjustment device be point C. The distance between B and A along the wire running direction is s, and the distance between B and C along the wire running direction is t. Since the pressure extrusion die, the fixed frame 21 of the eccentricity detection device 2, and the base frame 11 of the eccentricity adjustment device 1 remain fixed during the production process of the PEEK insulated wire, and since the pressure extrusion die is located between the eccentricity detection device and the eccentricity adjustment device, then t/s is a fixed value greater than 1.

Figure 7:
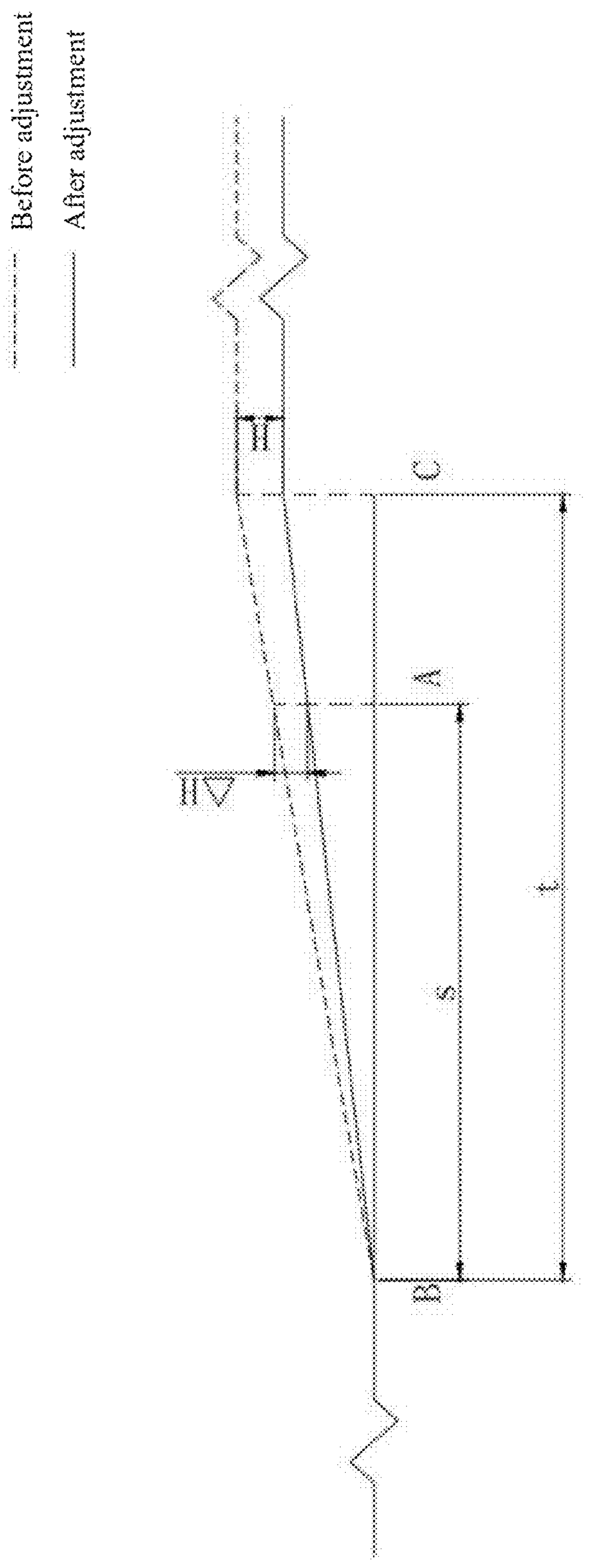
FIG. 7 is a schematic diagram illustrating the eccentricity adjustment in the vertical direction by the eccentricity adjustment device in an embodiment of the present application.

Referring to FIG. 7, taking the eccentricity adjustment in the vertical direction as an example, the displacement amount that the core wire should produce at the die orifice is ΔH. From the corollary of similar triangles, it can be deduced that $|H|/\Delta H=t/s$. And since $\Delta H=|(a-b)/2|$, it follows that $|H|=(t/s)\cdot|(a-b)/2|$. Let p=t/s, which is an adjustment coefficient greater than 1, thus $|H|=p\cdot|(a-b)/2|$. Similarly, it can be deduced that $|X|=p\cdot|(c-d)/2|$, where p=t/s is an adjustment coefficient greater than 1.

Thus, by measuring the coating thickness on the top, bottom, left, and right sides of the PEEK insulated wire and transmitting the measurement data to the processor 14, the processor 14 calculates the required displacement for core wire correction and transmits the displacement data to the first driving member 121 and the second driving member 131. The second driving member 131 drives the vertical movement unit 13 up or down, and the first driving member 121 drives the horizontal movement unit 12 left or right, thereby adjusting the running position of the core wire in real-time to ensure it always remains at the extrusion center of the die, which in turn reduces the eccentricity of the coating film.

The foregoing descriptions are merely preferred embodiments of the present application and are not intended to limit the scope of protection of the present application. Therefore, any equivalent changes made based on the structure, shape, and principles of the present application shall be encompassed within the scope of protection of the present application.

The invention claimed is:

1. A method for manufacturing a PEEK insulated wire, comprising the steps of:

preparing a PEEK material by drying the PEEK material for a period of time to completely remove moisture therefrom;

paying off a core wire by controlling the core wire to run at a predetermined tension value;

pre-heating the core wire before the core wire comes into contact with the PEEK material;

plasma cleaning the core wire;

extrusion coating the core wire by installing a matching pressure extrusion die on a head of an extruder according to specifications of the PEEK insulated wire to be produced, and extruding the PEEK material using vacuum extrusion to form the PEEK insulated wire;

cooling the PEEK insulated wire;

online inspecting, by an eccentricity detection device (2), an eccentricity of a coating film on the PEEK insulated wire; and taking up the PEEK insulated wire;

wherein the eccentricity detection device (2) comprises a fixed frame (21) through which the PEEK insulated wire is configured to pass, wherein an inner circumferential surface of the fixed frame (21) is provided with an upper coating thickness gauge (22), a lower coating thickness gauge (23), a left coating thickness gauge (24), and a right coating thickness gauge (25) on top, bottom, left, and right sides thereof, respectively, and wherein the upper (22), lower (23), left (24), and right (25) coating thickness gauges are located on a same vertical plane and are respectively configured to measure coating thicknesses on the top, bottom, left, and right sides of a same cross-section of the PEEK insulated wire;

wherein, in the extrusion coating step, before the core wire enters the extruder, a running position of the core wire is adjusted by an eccentricity adjustment device (1) to ensure that the core wire remains at an extrusion center of the pressure extrusion die;

wherein the eccentricity adjustment device (1) comprises a base frame (11), a left limit roller (111) and a right limit roller (112) configured to laterally limit the core wire, and an upper limit roller (113) and a lower limit roller (114) configured to vertically limit the core wire, wherein a distance between the left limit roller (111) and the right limit roller (112) is adjustable, and a distance between the upper limit roller (113) and the lower limit roller (114) is adjustable;

wherein the base frame (11) is provided with a horizontal movement unit (12) and a first driving member (121) configured to drive the horizontal movement unit (12) to move along a width direction of the base frame (11), and wherein the left limit roller (111) and the right limit roller (112) are arranged on the horizontal movement unit (12); and wherein the base frame (11) is provided with a vertical movement unit (13) and a second driving member (131) configured to drive the vertical movement unit (13) to move up and down, and wherein the upper limit roller (113) and the lower limit roller (114) are arranged on the vertical movement unit (13).

2. The method of claim 1, wherein in the pre-heating step, the core wire is pre-heated by vacuum induction heating.

3. The method of claim 2, wherein:

if a raw material for the core wire is a formed soft flat conductor, the core wire is directly pre-heated after the pay-off step;

if the raw material for the core wire is a round conductor, the method further comprises, before the pre-heating step, sequentially performing a round drawing step, a rolling step, and a flat drawing step; and if the raw material for the core wire is an extruded flat conductor, the method further comprises, before the pre-heating step, performing a flat drawing step.

4. The method of claim 3, wherein if the raw material for the core wire is the round conductor or the extruded flat conductor, the method further comprises, after completing the flat drawing step: cleaning the core wire; blow-drying and/or oven-drying the core wire after the cleaning; and performing an annealing treatment after a surface of the core wire is dry.

5. The method of claim 1, wherein the upper coating thickness gauge (22), the lower coating thickness gauge (23), the left coating thickness gauge (24), and the right coating thickness gauge (25) are each fixedly connected to a sliding rod (26); each of said sliding rods (26) is centripetally and slidably arranged on the fixed frame (21); front and rear sides of the upper (22), lower (23), left (24), and right (25) coating thickness gauges are each provided with an abutment wheel (27) configured to abut against the PEEK insulated wire; each of said abutment wheels (27) is connected to a corresponding one of the sliding rods (26) via a connecting bracket (28); and each of said sliding rods (26) is secured to the fixed frame (21) by a locking member (29).

6. The method of claim 5, wherein the eccentricity adjustment device (1) further comprises a processor (14), and wherein the upper coating thickness gauge (22), the lower coating thickness gauge (23), the left coating thickness gauge (24), the right coating thickness gauge (25), the first driving member (121), and the second driving member (131) are each in signal communication with the processor (14).

7. The method of claim 6, wherein the eccentricity adjustment device (1) adjusts the coating film eccentricity of the PEEK insulated wire by performing the steps of:

S1: adjusting each of the sliding rods (26) according to cross-sectional dimensions of the PEEK insulated wire such that four sides of the PEEK insulated wire respectively abut against corresponding ones of the abutment wheels (27), and locking each of the sliding rods (26) after ensuring the PEEK insulated wire is centered within the fixed frame (21);

S2: simultaneously measuring, by the upper (22), lower (23), left (24), and right (25) coating thickness gauges, coating thicknesses on four corresponding sides of the PEEK insulated wire to obtain an upper thickness value a, a lower thickness value b, a left thickness value c, and a right thickness value d, respectively;

S3: transmitting, by the upper (22), lower (23), left (24), and right (25) coating thickness gauges, the measured thickness values a, b, c, and d as signals to the processor (14);

S4: calculating, by the processor (14), a required vertical displacement H for the vertical movement unit (13) according to the formula $H=p\cdot(a-b)/2$, and a required horizontal displacement X for the horizontal movement unit (12) according to the formula $X=p\cdot(c-d)/2$, and transmitting the numerical values X and H as signals to the first driving member (121) and the second driving member (131), respectively; and S5: when $H<0$, driving, by the second driving member (131), the vertical movement unit (13) to move down by a distance of $p\cdot|(a-b)/2|$; when $H=0$, maintaining a position of the vertical movement unit (13); and when $H>0$, driving, by the second driving member (131), the vertical movement unit (13) to move up by a distance of $p\cdot|(a-b)/2|$; and when $X<0$, driving, by the first driving member (121), the horizontal movement unit (12) to move right by a distance of $p\cdot|(c-d)/2|$; when $X=0$, maintaining a position of the horizontal movement unit (12); and when $X>0$, driving, by the first driving member (121), the horizontal movement unit (12) to move left by a distance of $p\cdot|(c-d)/2|$;

wherein p is an adjustment coefficient greater than 1.

* * * * *